United States Patent [19]

Kinugasa et al.

[11] Patent Number: 4,714,424
[45] Date of Patent: Dec. 22, 1987

[54] VACUUM MOLD

[75] Inventors: Toshiyuki Kinugasa; Tamio Furuya, both of Hidaka; Yoshiki Ishige, Tokorozawa; Yuichi Tsuchimoto, Sakado; Shoji Takahashi, Iruma, all of Japan

[73] Assignee: Honda Giken Kogyo Kabushiki Kaisha, Tokyo, Japan

[21] Appl. No.: 787,774

[22] Filed: Oct. 15, 1985

[30] Foreign Application Priority Data

Oct. 18, 1984 [JP] Japan .................................. 59-219173
Apr. 5, 1985 [JP] Japan .................................. 60-71987

[51] Int. Cl.⁴ .............................................. B29C 51/10
[52] U.S. Cl. .................................... 425/388; 204/11; 249/55; 249/80; 249/113; 249/135; 249/141; 264/571; 425/DIG. 30
[58] Field of Search ................. 249/55, 61, 62, 80, 249/113, 134, 135, 141; 425/388, 470, 85, DIG. 30; 264/87, 571, 220; 204/281, 11

[56] References Cited

U.S. PATENT DOCUMENTS

| | | | |
|---|---|---|---|
| 3,001,582 | 9/1961 | Kindseth et al. | 249/134 |
| 3,216,074 | 11/1965 | Harrison | 249/135 |
| 3,353,219 | 11/1967 | Snyder | 249/141 |
| 3,434,182 | 3/1969 | Peterson | 425/470 |
| 3,811,175 | 5/1974 | Garner et al. | 249/80 |
| 4,063,705 | 12/1977 | Vodra | 249/80 |
| 4,077,853 | 3/1978 | Coll-Palagos | 204/11 |
| 4,579,632 | 4/1986 | Brotz | 204/11 |

FOREIGN PATENT DOCUMENTS

| | | | |
|---|---|---|---|
| 2196602 | 3/1974 | France | 249/135 |
| 59-201813 | 11/1984 | Japan | 249/135 |

Primary Examiner—Jay H. Woo
Assistant Examiner—James C. Housel
Attorney, Agent, or Firm—Roberts, Spiecens & Cohen

[57] ABSTRACT

A vacuum mold for vacuum-forming a plastic sheet heated to a high temperature to transfer grain patterns onto the surface of the plastic sheet, the mold comprising an electrocast shell formed, by an electroforming step, with a casting surface having the grain patterns thereon and a multitude of fine vacuum holes uniformly distributed at the casting surface. A back-up body is mounted at the rear surface of the electrocast shell and is provided with vent holes communicating with the vacuum holes in the shell.

22 Claims, 17 Drawing Figures

VACUUM MOLD

FIELD OF THE INVENTION

The present invention relates to a vacuum mold for vacuum forming a plastic sheet heated to a high temperature to transfer grain patterns onto the surface of the plastic sheet.

PRIOR ART

A vacuum mold is known in which an electrocast shell having grain patterns on a surface thereof is formed with numerous vacuum holes.

In the prior art, however, the vacuum holes are formed by drilling, electric discharging, laser beams, or the like, and therefore the diameter of the vacuum holes tends to be larger than necessary. This poses a problem in that not only will the grain be transferred onto the surface of the plastic sheet but the vacuum holes of a large diameter will be transferred as well which impairs the value of the product.

An electrocast shell is formed by applying an electroforming treatment to the surface of a precision model. After the electrocast shell has been released from the precision model, it is mounted on a support frame for effecting the molding operation.

However, the electrocast shell has a very small thickness and low rigidity, and therefore, the problem is posed that if a shock is exerted on the shell when mold adjustment is made or when an article is molded, the shell is capable of being deformed.

There is a further problem in that since the electrocast shell is in tight and close contact with the precision model, the release of the shell from the model is not easy to perform and in addition, during the release, the electrocast shell is deformed by internal stresses generated during the electroforming process. This deformation is likely to occur in the case of apparatus having large and complicated molding portions as in an electrocast shell for molding an instrument panel for vehicles.

SUMMARY OF THE INVENTION

It is an object of the present invention to provide a vacuum mold, which uses an electrocast shell in which grain patterns are formed on a casting surface thereof during the electroforming step and numerous fine vacuum holes are uniformly distributed over the entire surface, whereby products of high value can be formed without transferring the imprint of the vacuum holes onto the surface of the plastic sheet.

It is a further object of the present invention to provide a vacuum mold in which the entire mold has high strength and excellent durability.

It is another object of the invention to provide a vacuum mold in which grain patterns transferred on the plastic sheet are not broken.

It is still another object of the invention to provide a vacuum mold in which when the electrocast shell is released from the precision model, the releasing operation can be carried out easily and the electrocast shell can be prevented from being deformed.

In order to achieve the aforesaid objects, according to the present invention there is provided a vacuum mold for vacuum forming a heated plastic sheet to transfer grain patterns onto the surface of the plastic sheet, comprising an electrocast shell formed by an electroforming step, with a casting surface having the grain patterns and numerous fine vacuum holes uniformly distributed at said casting surface; and a back-up body at the rear surface of the electrocast shell having vent holes in communication with the vacuum holes.

In further accordance with the present invention, cooling pipes embedded in the back-up body.

In further accordance with the invention, the electrocast shell has a molding or forming portion and a surrounding mounting flange portion and the electrocast shell is supported by a support frame. The support frame comprises a frame body having a downwardly facing opening covered by the forming portion of the shell, and a support flange surrounding the downwardly facing opening is secured to the mounting flange portion of the frame. The forming portion is suspended by suspension members from the frame body and the back-up body is encased in the frame body and integrally connected to the rear surface of the forming portion.

In still further accordance with the invention, a fiber-reinforced plastic material is integrally secured to the mounting flange portion at the rear thereof and the support flange of the frame is connected to the mounting flange portion through the fiber-reinforced plastic material.

The invention contemplates that due to the provision of the fine vacuum holes uniformly distributed at the casting surface of the shell it becomes possible to obtain products of high value without transferring an imprint of the vacuum holes onto the surface of the plastic sheet.

In addition, since the electrocast shell is reinforced by the back-up body, the entire mold has high strength and excellent durability.

Futhermore, since the electrocast shell is cooled by the cooling pipes, the plastic sheet may be immediately cooled after the grain patterns have been transferred onto the surface of the sheet thereby to prevent the grain patterns from being broken. Moreover, since the back-up body is reinforced by the cooling pipes, the strength of the mold may be further enhanced.

In addition, since the molding portion of the electrocast shell is reinforced by the back-up body, even if a shock is exerted on the molding or forming portion when adjustment of the mold is made and when an article is molded, the molding portion is not deformed. Since the mounting flange portion of the electrocast shell is connected to the support flange, and the molding portion is suspended by the suspension members, the molding portion is not deformed by the weight of the back-up body. Accordingly, the vacuum mold according to the present invention has excellent durability.

Furthermore, since the support frame is disposed at the rear of the electrocast shell, it is possible to mount the electrocast shell on the support frame before the shell is released from the precision model to achieve the releasing operation through the support frame. Thereby, the releasing operation can be carried out easily, and the electrocast shell retains its shape due to its attachment to the support frame which prevents the shell from being deformed due to internal stresses generated during the electroforming process. This anti-deformation effect on the electrocast shell is further assured by joining the fiber-reinforced plastic material to the entire rear surface of the mounting flange portion of the electrocast shell.

DESCRIPTION OF THE PREFERRED EMBODIMENTS

Figure 1:
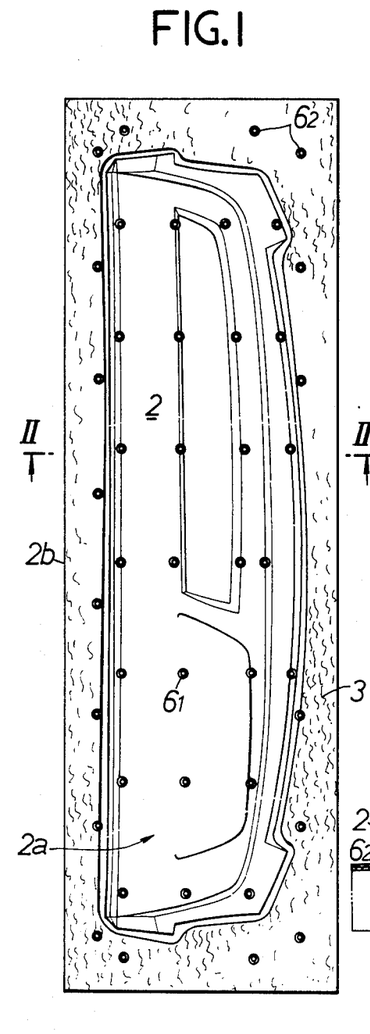
FIG. 1 is a rear view of an electrocast shell for a mold.
Figure 2:
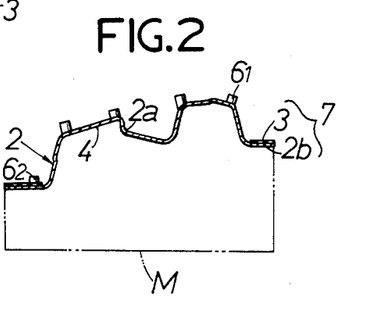
FIG. 2 is a sectional view taken along line II—II in FIG. 1.
Figure 5:
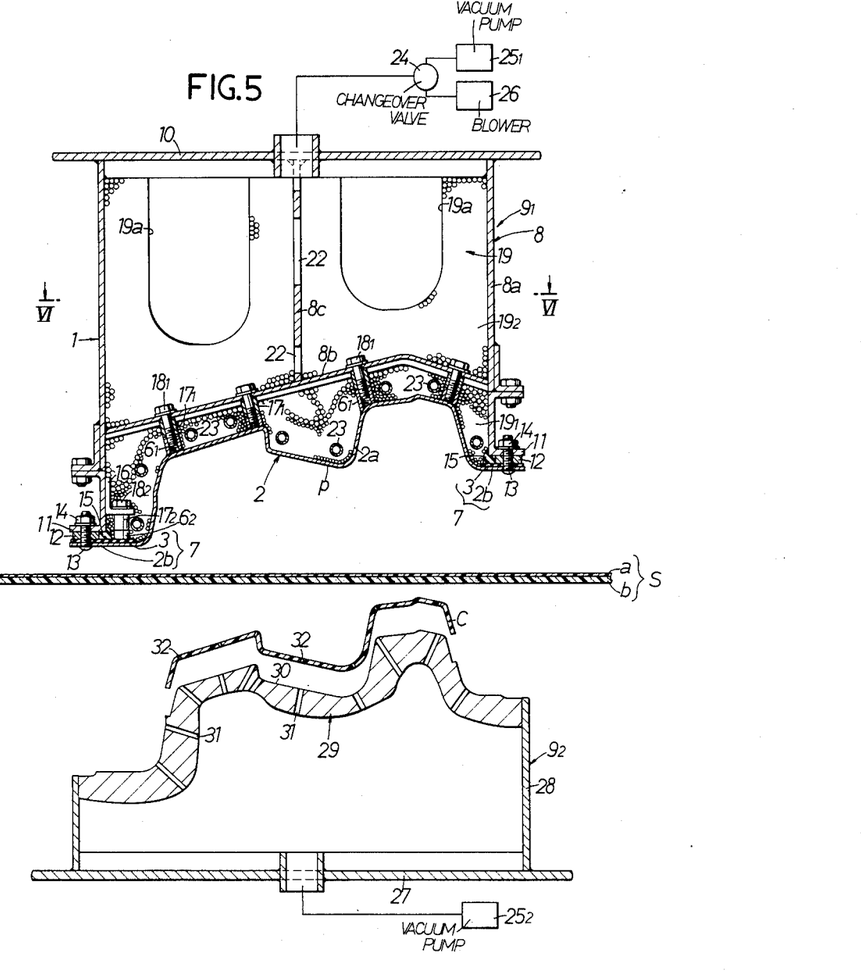
FIG. 5 is a longitudinal sectional view, prior to a manufacturing operation, of apparatus for manufacturing an instrument panel.

A vacuum mold 1 for molding an instrument panel for a vehicle is composed of a nickel electrocast shell 2 shown in FIGS. 1 and 2 supported on a support frame 8 as shown in FIG. 5, and a back-up body 19 encased in the support frame 8.

Figure 3:
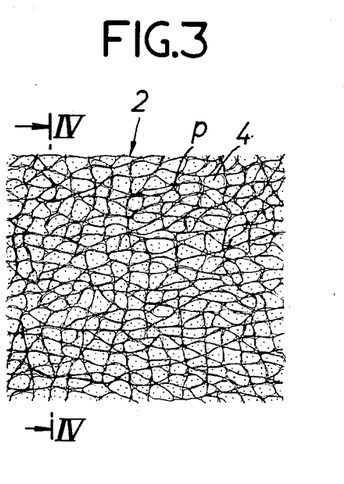
FIG. 3 is a front view, partly on an enlarged scale, of the electrocast shell.

The electrocast shell 2 is rectangular in plan and is constituted as a microporous body having permeability. The shell 2 has a thickness in the range of from 0.6 to 3 mm. The electrocast shell 2 comprises a molding portion 2a for forming a plastic or synthetic resin sheet into the shape of an instrument panel, and a mounting flange portion 2b at the outer periphery of the molding portion 2a and mounted on a further support frame which will be described later. Grain patterns p simulating cowhide (as shown in FIG. 3) are formed by an electroforming operation on the front surface 4 of the electrocast shell 2 as will be explained in greater detail later. The front surface 4 is directed downwardly in FIG. 2. The grain patterns on the molding portion 2a are intended to produce an imprinted grain pattern on the deformed plastic sheet.

Figure 4:
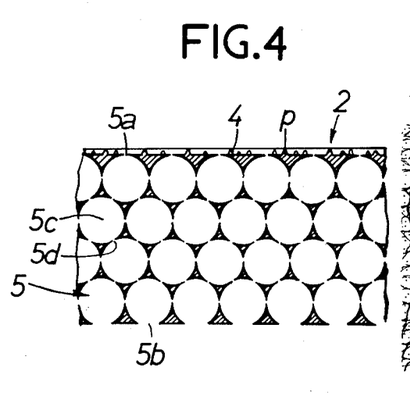
FIG. 4 is a sectional view taken along line IV—IV in FIG. 3.

As shown in FIG. 4 in the electrocast shell 2 are formed numerous fine vacuum holes 5 in the thickness direction of the shell 2 by the electroforming operation such that the vacuum holes 5 are uniformly distributed throughout the microporous body forming the shell. At the surface 4 of the shell, the fine vacuum holes 5 have tiny openings $5a$ which are longitudinally and laterally arrayed with a pitch of approximately 0.2 mm and have a diameter of from 0.03 to 0.05 mm. The openings $5a$ of the fine vacuum holes 5 are so small in diameter that they do not affect the grain patterns p imprinted on the plastic sheet.

A number of nut members $6_1$ are longitudinally and laterally arrayed on the rear surface of the molding portion 2a of the electrocast shell 2 as shown in FIG. 1 so that the nut members $6_1$ may be scattered all over the molding portion 2a. The nut members $6_1$ are welded to the shell 2 by stud welding. Also on the rear surface of the mounting flange portion 2b are welded a number of nut members $6_2$ by stud welding so that the nut members $6_2$ may be scattered all over the mounting flange portion 2b. The nut members $6_1$ and $6_2$ are utilized to suspend the electrocast shell 2 from the support frame as will be described later.

If stud welding is employed as described above, it is advantageous that even if numerous nut members $6_1$ and $6_2$ are welded on the extremely thin electrocast shell 2, the electrocast shell 2 is free from welding strain.

A reinforced plastic material 3 is secured to the rear surface of the mounting flange portion 2b over the entire extent thereof. The reinforced plastic material 3 comprises reinforcing fibers embedded in a thermosetting plastic. The reinforcing fibers are made of nonwoven fabric or the like formed by using one or more kinds of long fibers from among glass fibers, carbon fibers, metal fibers and the like. The thermosetting plastic can be epoxy resin or the like.

The fiber-reinforced plastic material 3 is applied, after welding the nut members $6_2$, over the entire rear surface of the mounting flange portion 2b of the electrocast shell 2, by arranging the fibers with a predetermined thickness and orientation on the flange portion, and applying the thermosetting plastic in liquid state on the fibers. The thermosetting plastic can be heated in order to be cured and upon curing, the fiber-reinforced plastic layer 3 is formed in situ in joined relation with the mounting flange portion 2b to form composite portion 7 of high rigidity.

The fiber-reinforced plastic material 3 is formed on the shell before the electrocast shell 2 is released, that is, when the electrocast shell 2 is still on a precision model M as will be explained in greater detail later.

When composite portion 7 is formed on the outer periphery of the molding portion 2a, deformation of the molding portion 2a is resisted by the composite portion 7. Therefore, the shape-retaining property of the electrocast shell 2 is enhanced to prevent the electrocast shell 2 from being deformed by internal stresses produced in the electroforming step at the time of its release from model M.

Figure 6:
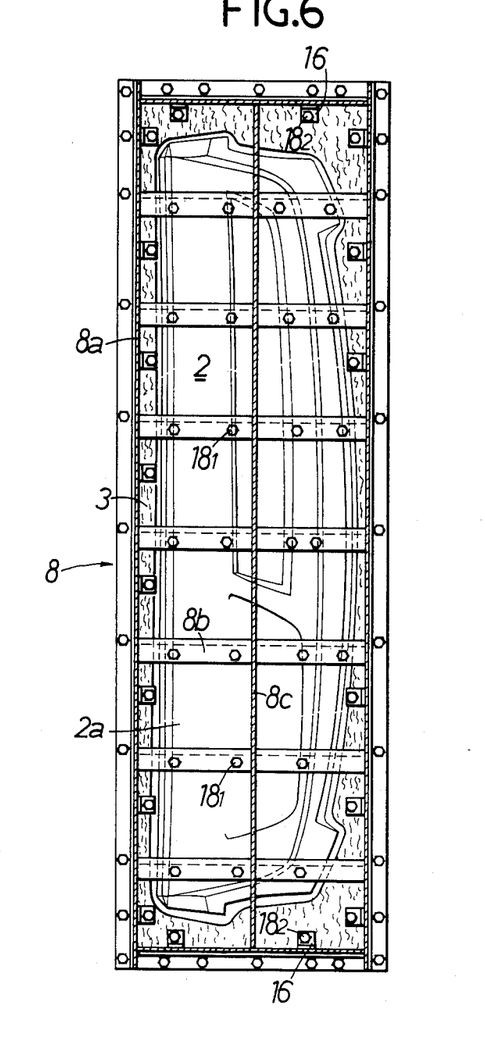
FIG. 6 is a sectional view taken along line VI—VI in FIG. 5.

The electrocast shell 2 is mounted on a support frame 8 as shown in FIGS. 5 and 6 to constitute a first movable portion $9_1$ which is movable up and down. This first movable portion $9_1$ is placed at a station for manufacturing the instrument panel and cooperates with a second movable portion $9_2$ arranged movably up and down therebelow.

In the first movable portion $9_1$, the support frame 8 comprises a frame body 8a in the form of a rectangular box provided with a top wall 10, a plurality of angle shaped crosspieces 8b arranged in equally spaced relation in the region of a downwardly oriented open portion of the frame body 8a at right angles to the length of the frame as seen in FIG. 6. The crosspieces 8b have opposite ends welded to the inner surfaces of the frame body 8a. A longitudinal support plate 8c has an upper end welded to the top wall 10 and a lower end welded to each crosspiece 8b.

The downwardly oriented open portion of the frame body 8a is covered by the molding portion 2a of the electrocast shell 2. A support flange 11 projects from the peripheral edge of the downwardly oriented open portion and is secured through a pad 12 at the rear surface of the mounting flange portion 2b of the electrocast shell 2, especially at the fiber-reinforced plastic material 3 in the composite portion 7. Both the flange portions 2b and 11 are connected along the periphery of the frame body 8a by a number of fastening bolts 13 and nuts 14. The composite portion 7 resists deformation even upon tightening the bolts 13 because of its excellent deformation resistance porperties. Internally of the pad 12, a vacuum seal 15 is interposed between the support flange 11 and the composite portion 7.

Selected nut members $6_1$ welded to the molding portion 2a of the electrocast shell 2 are arranged opposite associated crosspieces 8b. A cylindrical sleeve $17_1$ is interposed between the selected nut members $6_1$ and the crosspieces 8b. A suspension bolt $18_1$ extending through each crosspiece 8b and an associated cylindrical sleeve $17_1$ is screwed into the respective nut member $6_1$. The cylindrical sleeve $17_1$ serves as a spacer and has the function of controlling the fastening force of the suspension bolt $18_1$ to a predetermined degree to prevent the mounting flange portion 2b from being deformed.

In this manner, the nut members $6_1$, the crosspieces 8b and the suspension bolts $18_1$ constitute an assembly for suspending the molding portion 2a.

Welded to the inner surface of the frame body 8a are angle members 16 corresponding to the nut members $6_2$ welded to the rear surface of the mounting flange portion 2b of the electrocast shell 2. A cylindrical spacer sleeve $17_2$ is interposed between the nut member $6_2$ and the angle 16. A suspension bolt $18_2$ extending through the angle 16 and the cylindrical spacer $17_2$ is screwed into the nut member $6_2$.

A back-up body 19 essentially for strengthening the molding portion 2a of the electrocast shell 2 is encased in the support frame 8 and joined to the electrocast shell 2. The back-up body 19 comprises a first layer $19_1$, having vent holes, arranged on the electrocast shell 2 and formed by numerous, adjoining steel balls having excellent corrosion resistance, such as stainless steel, partially joined to each other by a thermosetting plastic such as an epoxy resin, and a second layer $19_2$ having vent holes, laminated on the first layer $19_1$ and including numerous adjoining glass particles partially joined to each other with a thermosetting plastic similar to that of the first layer.

Even with the back-up body 19 on the rear surface of the electrocast shell 2, there occurs no problem of deformation of the electrocast shell 2 due to the weight of the back-up body 19, since the mounting flange portion 2b of the electrocast shell 2, and thus the composite portion 7 is superposed on and connected to the support flange 11 of the support frame 8, and the composite portion 7 and molding portion 2a are supported by the crosspieces 8b and angle members 16 by suspension bolts $18_1$ and $18_2$.

Figure 7:
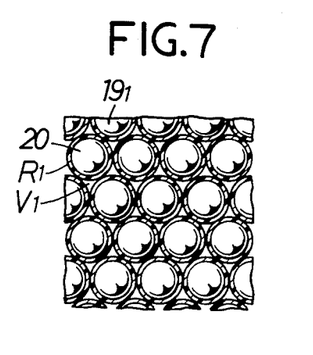
FIG. 7 is an enlarged sectional view of a part of a first layer of a back-up body.

In order to form the first layer $19_1$, a predetermined number of steel balls 20 of a diameter from 70 to 150μ each with a resin layer $R_1$ thereon of the thin thermosetting plastic material on the surface thereof as shown in FIG. 7 are introduced into the frame body 8a, without the top wall 10, at the rear surface of the electrocast shell 2. Thereafter, the steel balls 20 with resin layers $R_1$ are heated to 70° to 80° C. to join those parts of the adjoining balls which are in contact with one another to form gape $V_1$ surrounded by the joining points. Continuous vent holes are formed in the first layer $19_1$ by the gaps $V_1$ to confer porosity to the layer $19_1$. When the steel balls 20 are mutually joined together, a portion between the first layer $19_1$ and the electrocast shell 2 is also joined by the resin layer $R_1$.

Figure 8:
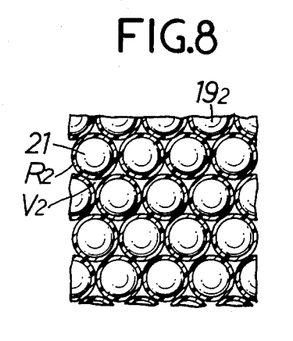
FIG. 8 is an enlarged sectional view of a part of a second layer of the back-up body.

In order to form the second layer $19_2$, members (not shown) having a shape to form weight-reducing recesses 19a are supported within the frame body 8a. A predetermined quantity of glass particles 21 of a diameter of from 400 to 600μ with the thin resin layer $R_2$ on the surface thereof as shown in FIG. 8 are introduced onto the first layer $19_1$, after which the glass particles 21 and resin layer $R_2$ are heated to 70° to 80° C. to join the particles together at contact points between the resin layer $R_2$ on the adjoining glass particles 21 to form gaps $V_2$ surrounded by the joining points. Continuous vent holes are formed in the second layer $19_2$ by the gaps $V_2$ thereby to confer porosity to the second layer $19_2$. When the glass particles 21 are mutually joined, the first layer $19_1$ and second layer $19_2$ are also joined.

The support plate 8c is formed with a plurality of openings 22 to prevent blockage of flow of the glass particles 21 by the support plate 8c when the particles 21 are poured into the frame body 8a.

Cooling pipes 23 are embedded in the first layer $19_1$ in a zigzag fashion so that the molding portion 2a may be cooled uniformly over the entire area thereof. In this case, the first layer $19_1$ mainly consists of steel balls 20 and therefore has excellent heat conductivity, and thus, the molding portion 2a may be cooled efficiently. Furthermore, the first layer $19_1$ is reinforced by the zigzag embedment of the cooling pipes 23.

The interior of the support frame 8 is connected to a vacuum pump $25_1$ and a blower 26 through a change-over valve 24.

The second movable portion $9_2$ is constructed as follows.

A press mold 29 in fitting relation with the molding portion 2a is fixedly secured to an upwardly oriented open portion of a rectangular support frame 28 provided with a bottom wall 27. The press mold 29 is formed at its upper surface with a recess 30 into which a core C is fitted. A plurality of vacuum holes 31 are provided in the press mold 29 in regions opposite the molding portion 2a. The interior of the support frame 28 is connected to a vacuum pump $25_2$.

The instrument panel is formed by the plastic sheet S and the core C. The plastic sheet S comprises a single-layer sheet of polyvinyl chloride or other suitable plastic, or a laminated sheet which uses the single-layer sheet as a skin to which is applied a polypropylene foam sheet as a cushion layer.

The core C is formed by forming a plate of ABS resin or the like with a plurality of small-diameter vacuum holes 32 and registering the plate with the recess 30 of the press mold 29, the vacuum holes 32 being in registry with the vacuum holes 31 of the press mold 29.

Next, the method of manufacturing an instrument panel will be described.

The surface of the core C is coated with hot melt adhesive and the adhesive is heated and softened.

As shown in FIG. 5, the first movable portion 9₁ is moved upward and the second movable portion 9₂ is moved downward to open the electrocast shell 2 and the press mold 29. The core C is fitted into the recess 30 of the press mold 29 with the coated surface facing outwardly. The vacuum holes 32 are brought into registration with the vacuum holes 31 of the press mold 29.

The plastic sheet S composed of a skin a and a cushion layer b is heated to a high temperature of approximately 180° C., and softened, and the plastic sheet S is disposed between the first and second movable portions 9₁ and 9₂ with the skin a positioned on top.

Figure 9:
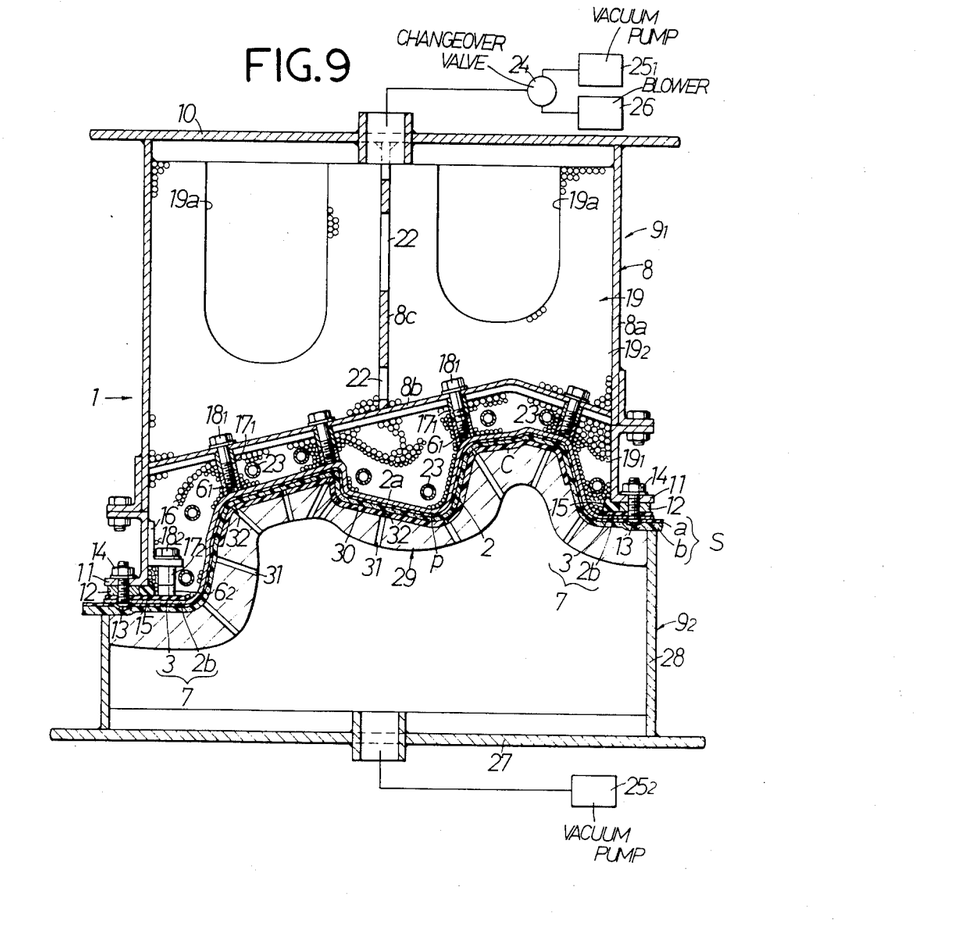
FIG. 9 is a longtiduinal sectional view of the apparatus during the manufacturing operation.

The first movable portion 9₁ is moved downwardly and the second movable portion 9₂ is moved upwardly to sandwich the plastic sheet S between the electrocast shell 2 and the press mold 29 as shown in FIG. 9. Since the plastic sheet S is pressed against the facing surface 4 of the shell 2 by the press mold 29, the sheet S has a good adaptability with respect to the surface 4.

The interior of the support frame 8 of the first movable portion 9₁ is connected to the vacuum pump 25₁ through the changeover valve 24. The vacuum pump 25₁ attracts the plastic sheet S. The molding portion 2a of the electrocast shell 2 has the fine vacuum holes 5 disposed over the entirety thereof, and the plastic sheet S is sufficiently conformed to the surface 4 of the molding portion 2a by the press mold 29. Therefore, the sheet S comes into tight and close contact with the entire surface of the molding portion 2a whereby the grain patterns p are accurately and clearly transferred onto the surface of the sheet S and at the same time the sheet S is formed into the shape of the molding portion 2a. Since the molding portion 2a is cooled by the cooling pipes 23, the sheet S is immediately cooled to prevent the grain patterns p and shape from being deformed.

The vacuum pump 25₂ on the side of the second movable portion 9₂ is actuated to attract the molded body formed by the sheet S against the press mold 29 and surface of the core C. The interior of the support frame 8 of the first movable portion 9₁ is connected to the blower 26 through the changeover valve 24 to apply a blowing pressure to the molded body.

the molded body is from the molding portion 2a and comes into close contact with the core C whereby the molded body and the core are joined together. Since the molded body is in tight and close contact with the molding portion 2a, combined use of vacuum attraction pressure and blowing pressure will be an extremely effective means to promote the release of the molded body.

The blower 26 is stopped, and the interior of the support frame 28 of the second movable portion 9₂ is connected to atmospheric pressure, after which the first movable portion 9₁ is moved upwardly while the second movable portion 9₂ is moved downwardly to remove the instrument panel from the press mold 29.

The grain patterns p are quite clearly applied to the surface of the instrument panel. The joining strength between the molded body composed of the plastic sheet S and the core C is great while providing excellent durability.

Although during the manufacture, a shock acts on the molding portion 2a of the electrocast shell 2 when the molding portion 2a is fitted in the press mold 29, the molding portion 2a is not deformed because the molding portion 2a is reinforced at its rear surface by the back-up body 19.

Hereafter, the manufacture of the electrocast shell 2 will be described with reference to FIGS. 10a to 10d which show the principle of manufacture.

Figure 10A:
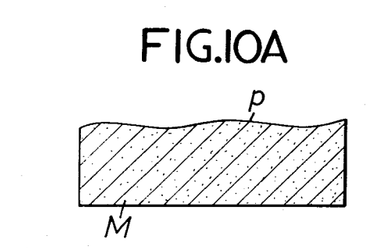
FIGS. 10a to 10d illustrate the steps of the process of manufacturing the electrocast shell.

Step (a) (FIG. 10a)

A precision model M having the grain pattern p is fabricated from cowhide using epoxy resin.

Figure 10B:
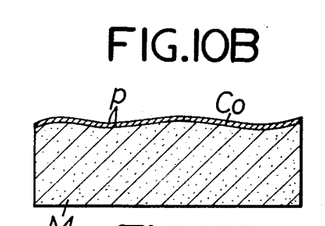

Step (b) (FIG. 10b)

The surface of the precision model M having the grain pattern p is subjected to a silver mirror treatment to form a thin conductive layer Co of silver with the grain pattern p on the entire surface of the conductive layer Co.

Figure 10C:
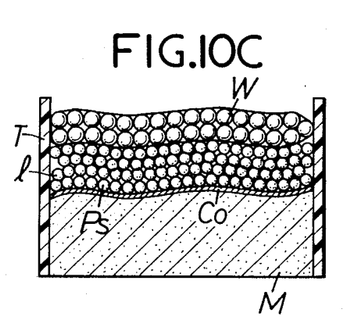

Step (c) (FIG. 10c)

The precision model M is peripherally surrounded by an insulating cylindrical body T, and a multitude of polystyrene particles Ps having a diameter of 0.2 mm, which are soluble or elutable and in the form of fine particles, are stacked on the entire surface of the conductive layer Co to form layers l, on which are placed anti-floating bodies W comprising glass particles in a nylon not whereby the lowermost layer of polystyrene particles Ps is brought into close contact with the surface of the conductive layer Co. Thereby, each of the polyestyrene particles Ps of the lowermost layer comes into close contact with the surface of the conductive layer Co in a point contact state.

Figure 10D:
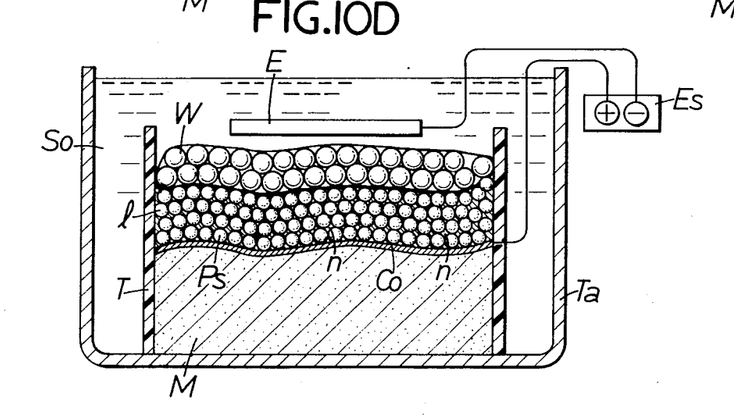

Step (d) (FIG. 10d)

The precision model M is put into a nickel-plating solution So in an electrocasting tank Ta. The conductive layer Co is connected to the (+) terminal of a power source Es while an electrode E opposite the anti-floating bodies W is connected to the (−) terminal of the source Es. The precision model M is then subjected to an electrocasting treatment. During the electrocasting treatment, spaces between the conductive layer Co and the polystyrene particles Ps, except the close contact portions between the conductive layer Co and the polystyrene particles Ps, and between the adjoining polystyrene particles Ps, are filled with the deposited nickel n thereby to obtain the electrocast shell 2 having the grain pattern p. The thickness of the shell 2 is set to be thinner than the particle layers l in order that the upper surface of the uppermost layer of polystyrene particles Ps is slightly exposed at the top of the electrocast shell 2.

The thus obtained electrocast shell 2 is released, and thereby the shell 2 is separated from the conductive layer Co. Thereafter, the shell is immersed into a solvent such as toluene, methylene chloride or the like to elute the polystyrene particles Ps from the electrocast shell 2 to form the fine vacuum holes 5 shown in FIG. 4. In this case, the particle layer l is partly exposed at the surface formed with the grain pattern p and at the rear surface of the electrocast shell 2, and therefore when the polystyrene particles Ps are dissolved at these exposed portions, openings 5a, 5b are formed. The electrocast shell 2 is formed with internal air holes 5c after elution of the polystyrene particles Ps and communicating holes 5d are formed, to provide communication between adjoining air holes 5c, at the contact points between the adjoining polystyrene particles Ps and the holes 5c.

Thereby, the obtained electrocast shell 2 has a multitude of fine vacuum holes 5 with the openings 5a and 5b of extremely small diameter at both surfaces thereof.

Particles capable of being eluted include, in addition to the aforesaid polystyrene particles Ps, paraffin particles, aluminum particles or the like. In the case of paraffin particles, they are eluted from the shell 2 by heating. In the case of aluminum particles, they are eluted from the shell 2 by heating or a chemical etching treatment.

The operation of releasing the electrocast shell 2 will be described hereinafter.

Figure 11:
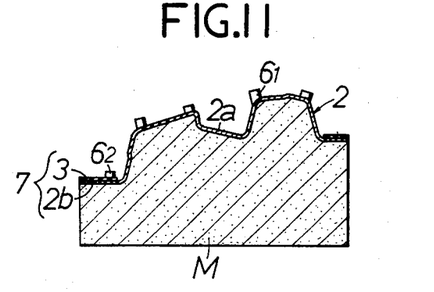
FIG. 11 is a longitudinal sectional view showing the relationship between the electrocast shell and a precision model.

As shown in FIG. 11, a number of the nut members $6_1$, $6_2$ are welded to the rear surface of the electrocast shell 2 while the shell is on the precision model M. The fiber-reinforcing plastic material 3 is joined to the entire rear surface of the mounting flange portion 2b.

Figure 12:
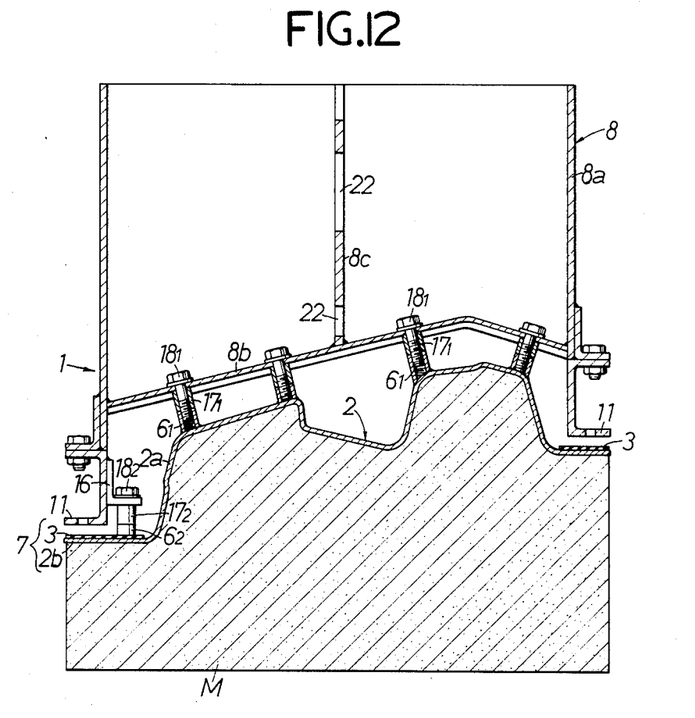
FIG. 12 is a longitudinal sectional view showing the releasing operation of the electrocast shell.

Then, as shown in FIG. 12, the support frame 8, without the top wall 10, is put on the electrocast shell 2, and the shell 2 is supported on the crosspieces 8b and the angle members 16 through the cylindrical sleeves $17_1$, $17_2$ and suspension bolts $18_1$, $18_2$.

Thereafter, the support frame 8 is raised to release the electrocast shell 2 from the precision model M.

Since at the time of release, the electrocast shell 2 is retained in shape by the composite portion 7 and the support frame 8, deformation of the electrocast shell 2 due to internal stress generated during the electroforming is prevented.

Figure 13:
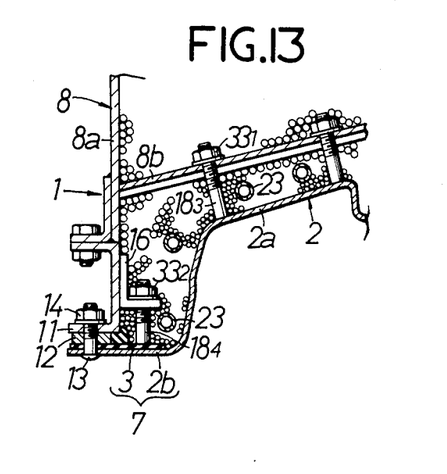
FIG. 13 is a longitudinal sectional view showing essential parts of a modified form of the suspension construction of the electrocast shell.

FIG. 13 shows a modified embodiment in which a number of suspension bolts $18_3$, $18_4$ are welded to the rear surface of the electrocast shell 2 by stud welding, and nuts $33_1$, $33_2$ are threadedly mounted on the bolts $18_3$, $18_4$.

Figure 14:
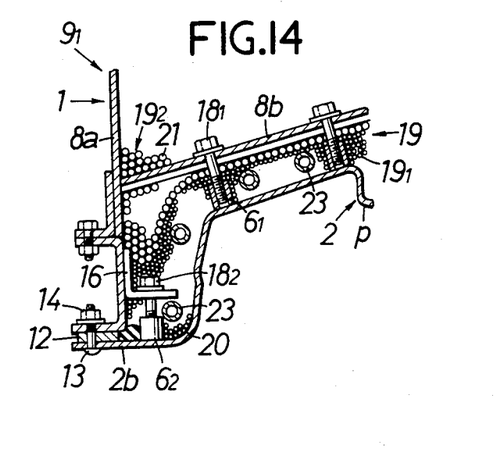
FIG. 14 is a longitudinal sectional view showing essential parts of a modified vacuum mold.

FIG. 14 shows a modified embodiment of a vacuum mold, which has the same construction as that of the previously described vacuum mold with the exception that the fiber-strengthening plastic material 3 and the cylindrical sleeves $17_1$, $17_2$ are not provided.

While the invention has been disclosed in relation to preferred embodiments thereof, it will become apparent to those skilled in the art that numerous modification and variations can be made within the scope and spirit of the invention as defined in the claims.

What is claimed is:

1. A vacuum mold for vacuum-forming a heated plastic sheet with an imprinted grain pattern on the surface of the sheet, said mold comprising:
   an electrocast shell including a microporous body having a front casting surface with a grain pattern thereon, said microporous body having a multitude of fine vacuum holes uniformly distributed at said front casting surface, and
   a back-up body on the rear surface of the microporous body, said back-up body comprising a multitude of adjoining small particles in contact with one another at contact points thereof, said particles being connected to one another at said contact points and providing vent spaces between said particles, said vent spaces being in communication with said fine vacuum holes in said microporous body, said back-up body comprising a first layer on said electrocast shell and a second layer laminated on said first layer, said particles in said first layer including a multitude of adjoining steel balls connected at contact points by a thermosetting plastic, said particles in said second layer including a multitude of adjoining glass particles connected at contact points by the thermosetting plastic.

2. A vacuum mold as claimed in claim 1 comprising cooling pipes embedded in said back-up body.

3. A vacuum mold as claimed in claim 2 wherein said cooling pipes are embedded in said first layer.

4. A vacuum mold as claimed in claim 1 comprising means for applying a vacuum to and through said back-up body to said shell.

5. A vacuum mold for vacuum-forming a heated plastic sheet with an imprinted grain pattern on the surface of the sheet while concurrently forming said sheet into a predetermined shape, said mold comprising:
   an electrocast shell including a forming portion and a surrounding mounting flange portion, said forming portion including a microporous body having a shaped front casting surface with a grain pattern thereon, said microporous body having a multitude of fine vacuum holes uniformly distributed at said front casting surface,
   a support frame including a frame body having a downwardly facing opening which is covered by said forming portion, a support flange surrounding said opening, said mounting flange portion of said shell being secured to said support flange of said frame,
   suspension means on said frame body for supporting said forming portion, and
   a back-up body supported within said frame body and connected to said forming portion at the rear surface thereof, said back-up body having vent holes in communication with said fine vacuum holes,
   said back-up body comprising a first layer on said electrocast shell and a second layer laminated on said first layer, said particles in said first layer including a multitude of adjoining steel balls connected at contact points by a thermosetting plastic, said particles in said second layer including a multitude of adjoining glass particles connected at contact points by the thermosetting plastic.

6. A vacuum mold as claimed in claim 5 comprising cooling pipes embedded in said back-up body.

7. A vacuum mold as claimed in claim 8 wherein said cooling pipes are embedded in said first layer.

8. A vacuum mold as claimed in claim 5 further comprising a fiber-reinforced plastic material integrally secured to said mounting flange portion at the rear thereof, said support flange of said support frame being secured to said mounting flange portion through said fiber-reinforced plastic material.

9. A vacuum mold as claimed in claim 5 wherein microporous body of said electrocast shell has a multitude of intercommunicating internal holes, said vacuum holes at said front casting surface being formed by openings in said body communicating with said internal holes.

10. A vacuum mold as claimed in claim 9 wherein said internal holes are distributed in layers in tangential contact with one another and which intercommunicate at the points of contact.

11. A vacuum mold as claimed in claim 10 wherein the internal holes in the layer at said casting surface are in tangential contact at said casting surface and said vacuum holes are formed at the points of tangential contact.

12. A vacuum mold as claimed in claim 10 wherein said shell has a rear surface opposite said front casting surface, the internal holes in the layer at the rear surface having openings thereat which are larger than the vacuum holes at the front casting surface.

13. A vacuum mold as claimed in claim 12 wherein said internal holes are spherical and are formed by elution of hollow spherical balls in said body of the shell.

14. A vacuum mold as claimed in claim 5, wherein said support frame includes crosspieces extending substantially horizontally above said forming portion of the shell, said suspension means being mounted on said crosspieces to suspend the forming portion at the rear surface thereof.

15. A vacuum mold as claimed in claim 14, wherein said suspension means includes a plurality of nut members welded to the rear surface of the forming portion of the shell, and a suspension bolt extending through the crosspiece and screwed into each nut member.

16. A vacuum mold as claimed in claim 5 comprising means for applying a vacuum to and through said back-up body to said shell.

17. A vacuum mold for vacuum-forming a heated plastic sheet with an imprinted grain pattern on the surface of the sheet while concurrently forming said sheet into a pre-determined shape, said mold comprising:

an electrocast shell including a forming portion and a surrounding mounting flange portion, said forming portion including a microporous body having a shaped front casting surface with a grain pattern thereon, said microporous body having a multitude of fine vacuum holes uniformly distributed at said front casting surface.

a support frame including a frame body having a downwardly facing opening which is covered by said forming portion, a support flange surrounding said opening, said mounting flange portion of said shell being secured to said support flange of said frame, suspension means on said frame body for supporting said forming portion, and a back-up body supported within said frame body and connected to said forming portion at the rear surface thereof, said back-up body having vent holes in communication with said fine vacuum holes, said microporous body of said electrocast shell having a multitude of intercommunicating internal holes, said vacuum holes at said front casting surface being formed by openings in said body communicating with said internal holes, said internal holes being distributed in layers in tangential contact with one another and which intercommunicate at the points of contact.

18. A vacuum mold as claimed in claim 17 wherein said back-up body comprises a multitude of adjoining smal particles in contact with one another at contact points thereof, said particles being connected to one another at said contact points to form vent spaces between the particles constituting said vent holes.

19. A vacuum mold as claimed in claim 17 wherein the internal holes in the layer at said casting surface are in tangential contact at said casting surface and said vacuum holes are formed at the points of tangential contact.

20. A vacuum mold as claimed in claim 17 wherein said shell has a rear surface opposite said front casting surface, the internal holes in the layer at the rear surface having openings thereat which are larger than the vacuum holes at the front casting surface.

21. A vacuum mold as claimed in claim 17 wherein said internal holes are spherical and are formed by elution of hollow spherical balls in said body of the shell.

22. A vacuum mold for vacuum-forming a heated plastic sheet with an imprinted grain pattern on the surface of the sheet while concurrently forming said sheet into a pre-determined shape, said mold comprising:

an electrocast shell including a forming portion and a surrounding mounting flange portion, said forming portion including a microporous body having a shaped front casting surface with a grain pattern thereon, said microporous body having a multitude of fine vacuum holes uniformly distributed at said front casting surface, a support frame including a frame body having a downwardly facing opening which is covered by said forming portion, a support flange surrounding said opening, said mounting flange portion of said shell being secured to said support flange of said frame, and crosspieces extending substantially horizontally above said forming portion of the shell suspension means mounted on said crosspieces to suspend said forming portion at the rear surface thereof, said suspension means including a plurality of nut members welded to the rear surface of the forming portion of the shell and suspension bolts extending through the crosspieces and screwed into the nut members, and a back-up body supported within said frame body and connected to said forming portion at the rear surface thereof, said back-up body having vent holes in communication with said fine vacuum holes.

* * * * *